March 28, 1939.    T. SHAW    2,152,217
BOX HAND TRUCK
Filed Sept. 15, 1936
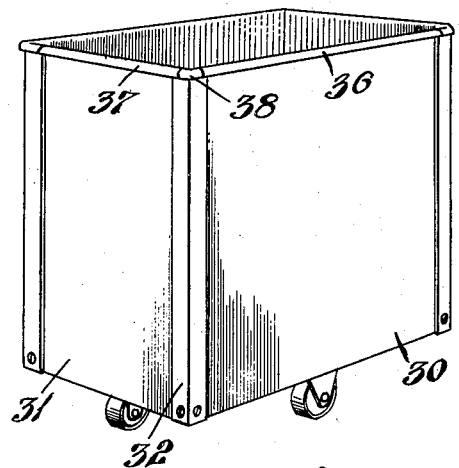
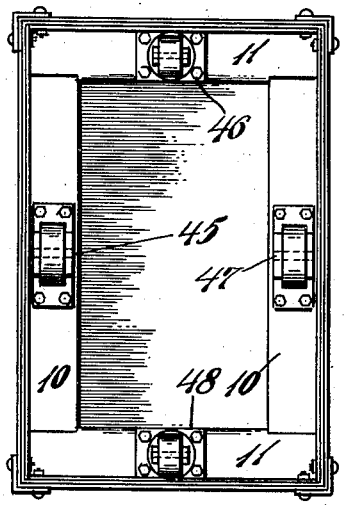
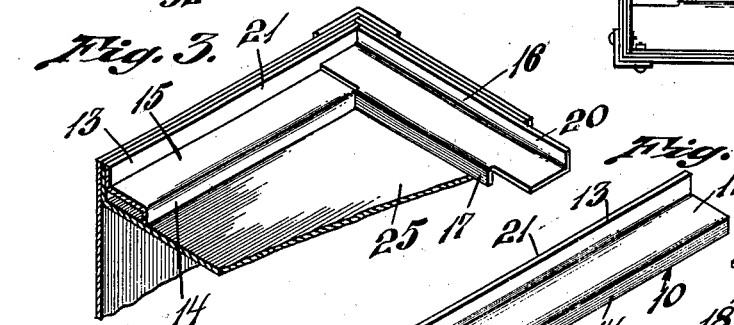
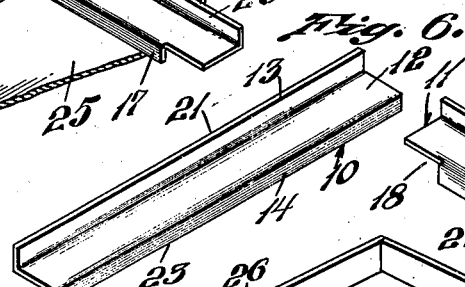
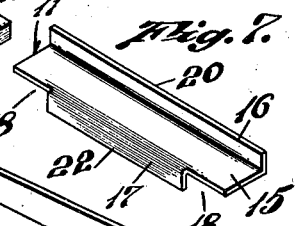
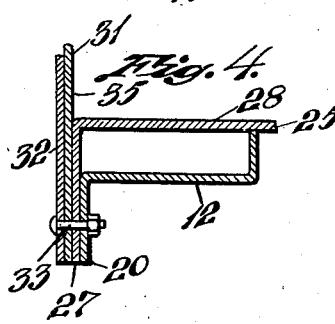
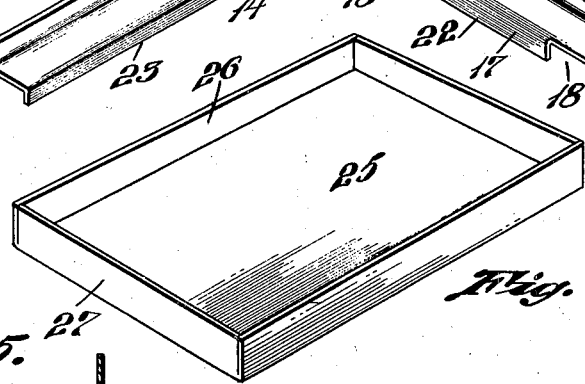
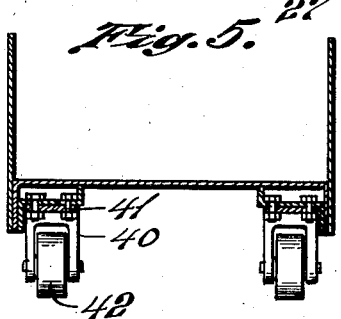
INVENTOR.
Thomas Shaw
BY Barlow & Barlow
ATTORNEYS.

Patented Mar. 28, 1939

2,152,217

UNITED STATES PATENT OFFICE 2,152,217

BOX HAND TRUCK

Thomas Shaw, Cranston, R. I.

Application September 15, 1936, Serial No. 100,800

9 Claims. (Cl. 280—50)

This invention relates to a hand truck of the box type which may be pushed about the floor of a mill or factory, and more particularly to the box type of such truck; and the invention has for one of its objects the provision of such a truck in which the bottom wall is perfectly plain and free from any obstacles such as bolts or the like which in many trucks have obstructed the surface of the bottom wall.

Another object of the invention is the provision of a truck having a bottom wall which is supported at its outer edge portion and also at points spaced inwardly from the outer edge of the bottom that a better support for the same may be provided.

Another object of the invention is the formation of a truck which when formed of stainless steel clad or plated material will be of such arrangement that any rust or corrosion forming on the outside surface of the material which is the opposite surface from the stainless steel plate will not seep into the truck to stain any fabrics or cloth which may be transported therein.

Another object of the invention is the formation of a truck in a very simple and yet strong and economical manner.

With these and other objects in view, the invention consists of certain novel features of construction, as will be more fully described, and particularly pointed out in the appended claims.

In the accompanying drawing:

Fig. 1 is a perspective view of the truck;

Fig. 2 is a bottom plan view thereof;

Fig. 3 is a fragmental perspective view looking at the bottom inside corner of the truck and showing the structural relation of the frame, side and bottom walls of the truck;

Fig. 4 is a sectional view through a corner portion of the truck;

Fig. 5 is a sectional view through the central portion of the truck showing the mounting for the wheels;

Fig. 6 is a perspective view looking at the underside of a side frame member;

Fig. 7 is a perspective view looking at the underside end frame member;

Fig. 8 is a perspective view of the bottom wall of the truck looking at the underside thereof.

Hand trucks are usually formed by mounting wheels for the truck on the bottom wall thereof with the bolts projecting inwardly from the truck. Thus, even though stainless steel plate is used for the side walls and bottom wall, the openings through the bottom wall and the bolts which extend therethrough transmit rust to the interior of the truck. Likewise, the usual truck is so constructed that the corrosion on the parts intended for the outer surface of the stainless steel clad material will seep through the joints to the interior of the truck; and in order to avoid these difficulties I have arranged the construction of the truck so that no bolts will appear on the inner surface and the stainless steel edges at the joints will be so arranged as to prevent any seepage of rust into the truck; and further, I have so constructed the truck that the bottom wall is better supported such as from its edge portions as well as at points spaced inwardly therefrom; and the following is a more detailed description of the present embodiment of this invention, illustrating the preferred means by which these advantageous results may be accomplished:

With reference to the drawing, the truck consists of a framework formed of side members 10 and end members 11 each of which are of Z-shape cross-section. The longer members 10 have an intermediate portion 12 and a downwardly extending flange 13 and an upwardly extending flange 14. The end members 11 comprise the intermediate or middle portion 15 and the downwardly extending flange 16 and the upwardly extending flange 17. The arrangement of the frame is such that the intermediate portions 12 and 15 of the members overlap at their ends with the portion 12 above the portion 15 and forming the corner of the frame, the upwardly extending flange 17 being cut away as at 18 for the reception of this end portion of the side member 10, see Figure 3. The flanges 13 and 16 differ in extent in an amount equal to the thickness of the middle portion 12 or 15 (usually of equal thickness), so that the edge surfaces 20 and 21 will be in substantially the same plane when the frame is assembled and the overlapping relation of the frame members occurs. Likewise, the flanges 14 and 17 differ in extent from their middle portions 12 and 15 in an amount equal to the thickness of the middle portions 12 or 15 so that their upper edges 22 and 23 will be in substantially the same plane when the frame is assembled and in a position to support the bottom wall 25 of the truck, as will be readily apparent from Fig. 3.

The bottom wall designated generally 25 is provided with downwardly extending side flanges 26 and downwardly extending end flanges 27 which are folded from the stock of the bottom wall 25. The undersurface of this bottom wall engages the edges 22 and 23 of the frame members, while its flanges 26 and 27 extend downwardly along the downwardly extending flanges 13 and 16 of the frame to the lower edge of the frame and snugly engage therewith. If this truck is made of stainless steel clad material the upper surface 28 of the bottom wall will be the stainless steel coated portion, while the under surface will be the usual material to which the stainless steel coat is attached.

The side walls of the truck are designated generally 30 and the end walls 31. These are sheet stock which are laid against the flanges of the bottom wall snugly engaging therewith and extending from the bottom edge of the flange of the bottom wall upwardly. Angle iron corner pieces 32 are positioned about the corners or junction of the edges of the side and end walls 30 and 31 and are bolted in place at their lower ends as at 33 on each of two sides which serves to attach the entire assembly of frame, bottom wall, side walls and corner pieces together. If desired, the edges of the side and end walls at the corners may be additionally secured by welding. The side and end walls 30 and 31 may have their inner surfaces 35 of the stainless steel plate and the welding used at the corners will be of stainless steel material. Thus, the truck may be stainless steel clad throughout its inner surface with no seepage of rust through the joints of the different parts which come together.

The upper edges 36 and 37 of the side walls 30 and 31 are rolled outwardly to provide a smooth surface and are suitably connected at the corners by the insertion of a core which is covered with a welding material of stainless steel where such structure is used, as at 38 which will be more fully described in my co-pending application.

By reason of the flanged bottom wall and the sides extending below the surface thereof a pocket is formed beneath the body portion of the truck. Also, by reason of the framework which I provide for the assembly of the side walls and the bottom wall, the middle portions, 12 and 15 of the members of the frame, will be spaced from the bottom wall 25. Thus, I provide a portion to which the wheel brackets may be secured by bolts without the bolts protruding into the inside of the body. These wheel brackets are designated generally 40 and consist of a U-shaped frame bolted as at 41 to the middle portion of the Z-shape member of the framework. These U-shaped portions each support a wheel as at 42 which is to rest upon the floor for easy pushing about of the truck. These wheel units may be provided in any desired number, I here have shown for illustrative purposes four, one being mounted in the middle of each frame member. Thus, these units are shown in these four positions as 45, 46, 47 and 48.

By the arrangement above specified the truck has a framework upon which the wheels are supported. The bottom wall is imperforate and not pierced by the wheel bracket bolts 41. The edges of the bottom wall are turned downwardly presenting the stainless steel surface of the flange and side wall together, thus at the juncture of this bottom wall and the side walls there is a long length of material where stainless steel engages stainless steel, and the junction of the side walls with each other being welded together with stainless steel material prevents any seepage of rust into the body at these points.

This structure is extremely simple and easy of assemblage. The bottom wall is supported not only from the sides but also from a point spaced a substantial distance inwardly from the sides so as to support the bottom wall against downward buckling.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A box truck having upstanding walls, a bottom wall located above the lower edge of said upstanding walls and provided with a flange extending downwardly along said upstanding walls, and an angle iron having a portion spaced from the bottom wall and engaging said flange and a portion supporting said bottom wall at a point inwardly from said upstanding walls, and means secured only to said angle iron for mounting wheels.

2. A box truck having side and end walls, a bottom wall located above the lower edge of said side and end walls and provided with a flange extending downwardly along said side and end walls, and an angle iron having a portion spaced from the bottom wall and engaging said flange and a portion supporting said bottom wall at a point inwardly from said side walls and end walls, and means secured only to said angle iron for mounting wheels.

3. A box truck having upstanding walls, a bottom wall located above the lower edge of said upstanding walls and provided with a flange extending downwardly along said upstanding walls, and a Z-shaped angle iron having one end portion extending along said flange and the other end portion engaging said bottom wall at a point inwardly from said upstanding walls, and means on said angle iron for mounting wheels.

4. A box truck having side and end walls, a bottom wall located above the lower edge of said side and end walls and provided with a flange extending downwardly along said side and end walls, a Z-shaped angle iron having one end portion extending along said flange and the other end portion engaging said bottom wall at a point inwardly from said side and end walls, with the middle portion spaced from and parallel to said bottom wall, wheels, and hangers secured to the middle portion of said angle iron for supporting said wheels.

5. In a box truck, a Z-shaped angle iron frame formed of four members in generally rectangular arrangement with the end portions of the Z-shaped members cut away on one flange and overlapping on their middle web.

6. In a box truck, a Z-shaped angle iron frame formed of four members in generally rectangular arrangement with the end portions of the Z-shaped members having their middle web portions overlapping, and the flange portions of the members being of lengths to present their edges in a single plane.

7. In a box truck, a Z-shaped angle iron frame formed of four members in generally rectangular arrangement with end portions of the Z-shaped members cut away on one flange and overlapping on their middle web, and the flange portions of the members being of lengths to present their upper edges in a single plane and inwardly of the frame, and a bottom wall supported on said edges.

8. In a box truck, a Z-shaped angle iron frame formed of four members in generally rectangular arrangement with the end portions of the intermediate portions of the Z-shaped members overlapping, and wheel hangers secured only to said intermediate portions of said members.

9. In a box truck, a Z-shaped angle iron frame formed of four members in generally rectangular arrangement with the end portions of the intermediate portions of the Z-shaped members overlapping, and the flange portions of the members being of lengths to present their upper edges in a single plane and inwardly of the frame, a bottom wall supported on said edges, and wheel hangers secured to said intermediate portions of said members, and spaced from said bottom wall.

THOMAS SHAW.